Nov. 11, 1952     H. L. HILDESTAD     2,617,478
SELECTIVE CONTROL OF FUEL NOZZLE MANIFOLDS
TO VARY DISCHARGE FLOW CAPACITY
Filed Aug. 29, 1949

INVENTOR
Harold L. Hildestad

BY
ATTORNEY

Patented Nov. 11, 1952

2,617,478

UNITED STATES PATENT OFFICE 2,617,478

SELECTIVE CONTROL OF FUEL NOZZLE MANIFOLDS TO VARY DISCHARGE FLOW CAPACITY

Harold L. Hildestad, Swarthmore, Pa., assignor to Westinghouse Electric Corporation, East Pittsburgh, Pa., a corporation of Pennsylvania Application August 29, 1949, Serial No. 112,957

3 Claims. (Cl. 158—36.3)

This invention relates to power plants, particularly to fuel supply apparatus therefor, and has for an object the provision of improved fuel distributing means for an aviation engine.

In order to fulfill fuel requirements of a power plant, such as an aviation gas turbine engine, when operating at altitudes exceeding 60,000 feet, it is necessary to overcome the adverse effects of low pressure and low rate of flow of fuel for ensuring equal distribution of fully atomized fuel to all areas of the combustion apparatus. It will be understood that the fuel requirement of such a power plant at sea level will greatly exceed that under high altitude conditions, so that a fuel system must be provided which can be operated to deliver fuel over a wide range in rates of flow. The range of a fuel system may be defined as the ratio of its minimum fuel flow requirements to its maximum flow requirements.

In designing an aviation fuel system having a suitable range, it is desirable to avoid a construction which would necessitate use of fuel pressures in excess of a safe maximum value, which is about 600 pounds per square inch, in conventional practice. It is, therefore, a further object of this invention to provide a fuel system having more than the usual single set of fuel supply communications, so that by selective supply of fuel through one or more sets of communications, metering of fuel over an adequate range may be effected with a maximum pressure under the limit considered feasible for apparatus associated with an aircraft power plant.

Another object of the invention is the provision of a dual flow fuel system for a gas turbine engine, including separate sets of fuel metering orifices, and means automatically operable, in accordance with variations in the fuel demand indicated, to effect supply of fuel under suitable pressure through both sets of orifices at one time, and through only one set of orifices at another time.

Figure 1:
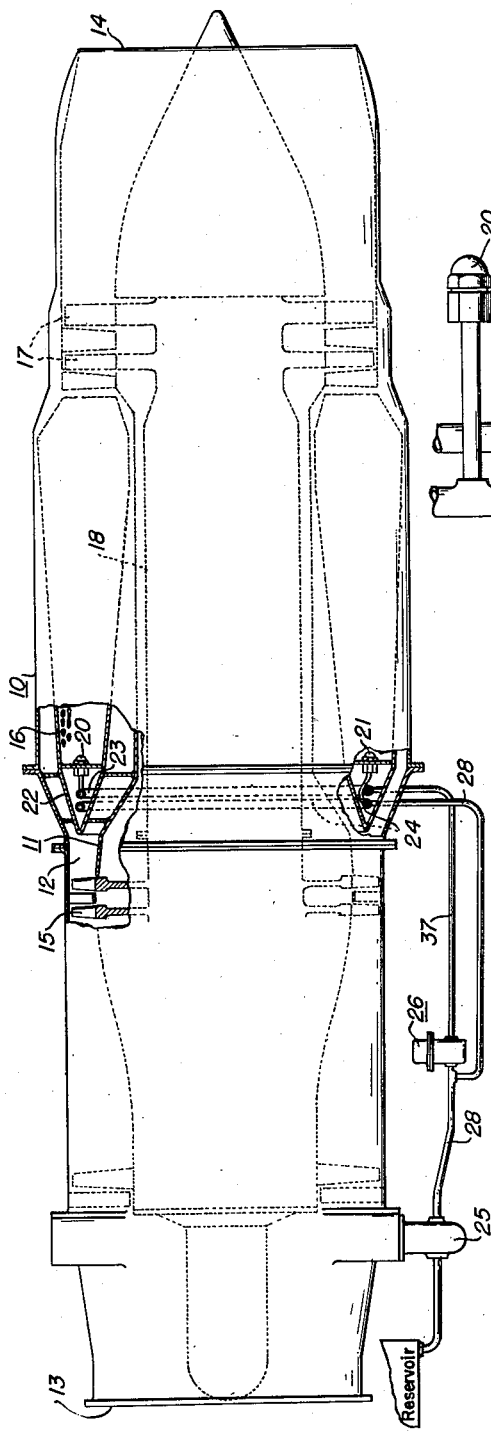
Figure 2:
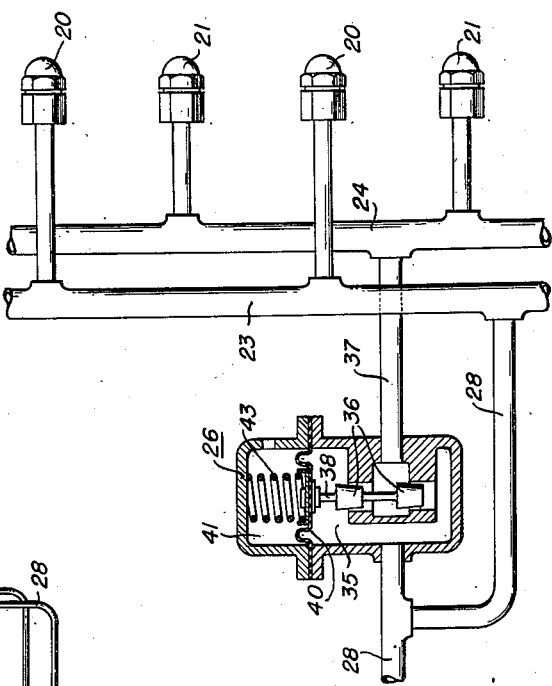

These and other objects are effected by my invention as will be apparent from the following description and claims taken in connection with the accompanying drawings, forming a part of this application, in which:

Fig. 1 is a schematic elevational view of a typical aviation gas turbine power plant equipped with an improved fuel system constructed in accordance with the invention; and Fig. 2 is a diagrammatic sectional view of the fuel supply apparatus shown in Fig. 1.

Referring to Fig. 1 of the drawing, the typical aviation gas turbine or turbojet engine therein disclosed comprises an outer substantially cylindrical casing structure 10, an interiorly disposed sectional core structure, generally indicated at 11, forming an annular flow passage 12 extending from a frontal air inlet opening 13 to a rearwardly-directed nozzle 14, and operating elements aligned therein and including an axial-flow compressor 15, combustion apparatus 16, and a turbine 17 connected to the compressor by a common shaft 18. The general principles of operation of such a power plant are well known, and may be briefly summarized as follows: Air entering the inlet opening 13 is delivered under pressure from the compressor 15 to the combustion apparatus 16 for supporting combustion of fuel supplied thereto as hereinafter explained, and the heated motive gases thus provided are then expanded through the turbine 17 and are finally discharged to atmosphere by way of the nozzle 14, establishing a propulsive thrust.

For supplying fuel to the combustion apparatus 16 there are provided two sets of nozzles 20 and 21 of a suitable fixed orifice type, which may be mounted in a fairing structure 22 carried in passage 12 adjacent the upstream end of the combustion apparatus 16. A pair of fuel manifolds, which may be designated primary and secondary manifolds 23 and 24, respectively, are provided for supplying fuel to the nozzles 20 and 21 at rates determined by operation of an associated control system which includes a pump and governor apparatus 25, and selector control apparatus indicated generally at 26.

The pump and governor apparatus 25 may be of any suitable construction, and is responsive to manual operation or to automatic scheduling or indications of operating conditions such as engine speed, temperature and altitude, for varying the rate of supply of fuel under pressure to a fuel input pipe 28, one branch of which communicates directly with the primary manifold 23, and another branch of which leads to the selector control apparatus 26.

As best shown in Fig. 2, the selector control apparatus 26 constructed in accordance with the invention may comprise a casing having a valve chamber 35, which communicates with the fuel input pipe 28 and contains a double or balanced valve element 36 adapted for controlling communication between the valve chamber and a pipe 37 leading to the secondary manifold 24. The valve element 36 has a stem 38 which is secured to a flexible diaphragm 40 that is interposed between the valve chamber 35 and a chamber 41 communicating with the atmosphere. A biasing spring 43 is interposed between the diaphragm 40 and the end wall of the chamber 41 for urging the valve element 36 toward its seated position.

It will be understood that each of the nozzles 20 and 21 of the fuel system is provided with a fixed metering orifice or set of swirl slots (not shown). Preferably, the nozzles 20 have small orifices of a suitable predetermined flow area, while the nozzles 21, which may be spaced between the respective nozzles 20, have larger orifices likewise of predetermined flow area.

In operation, when fuel under pressure is supplied from the governor apparatus 25 at a high rate or at a rate of flow at least exceeding the minimum or dribble rate, some of the fuel is supplied to the primary manifold 23 and issues from the nozzles 20. At the same time, the pressure of fuel supplied from the input pipe 28 into the valve chamber 35 of the selector control apparatus 26 imposes sufficient force on the diaphragm 40 to maintain the valve element 36 in an unseated position, against the force of spring 43, as illustrated in the drawing, thereby permitting flow of fuel through the pipe 37 and secondary manifold 24 to the discharge nozzles 21. Fuel is thus metered by both sets of nozzles, and can readily be supplied at a rate satisfying moderate to maximum demand as scheduled or indicated by the engine operating conditions.

If the power plant is operated under high altitude conditions requiring supply of fuel at an extremely low or dribble rate, however, the resultant reduction in the pressure of fuel supplied by the governor apparatus 25 and acting on the diaphragm 40 permits the spring 43 to move the valve element 36 to its seat, thereby cutting off further flow of fuel to the pipe 37 and secondary manifold 24. Consequently, fuel under the reduced pressure determined by the governor apparatus is thereafter metered through only the relatively restricted orifices of the primary nozzles 20, thus extending the available range of the fuel system while retaining operational advantages inherent in a system of the fixed orifice type.

While I have shown the invention in but one form, it will be obvious to those skilled in the art that it is not so limited, but is susceptible of various changes and modifications without departing from the spirit thereof.

What I claim is:

1. Combustion apparatus comprising a combustion chamber, a source of liquid fuel under pressure ranging up to about 600 lbs. per sq. inch, a first set of fuel nozzles having discharge openings of small flow area, a second set of fuel nozzles having discharge openings of large flow area, said nozzles being disposed for discharging fuel into said chamber, a control valve device interposed between said source of fuel and said second set of nozzles and subject to variations in fuel pressure for throttling flow of fuel therethrough, and an always open communication by-passing said control valve device and connecting said source to said first set of nozzles.

2. In a fuel system for combustion apparatus, a source of liquid fuel under pressure ranging up to about 600 lbs. per sq. inch, a primary fuel manifold always communicating therewith, a secondary fuel manifold, primary and secondary fuel nozzles communicating with said primary and secondary manifolds, respectively, and a control valve device interposed between said source and said secondary manifold and operative for selectively opening and closing communication therebetween, in accordance with the pressure of fuel from said source.

3. Fuel control apparatus for an aviation gas turbine power plant adapted for operation at high altitudes, comprising pump and governor apparatus operative to supply fuel under varying pressures ranging up to about 600 lb. per sq. inch, a plurality of primary fuel nozzles of predetermined flow capacity efficient at high altitude, a plurality of secondary fuel nozzles of greater flow capacity, a control valve device having an inlet communicating with said pump and governor apparatus, an outlet communicating with said secondary fuel nozzles and fluid pressure operative valve means subject to fuel pressure in said inlet for controlling communication therefrom to said outlet, and an always open communication connecting said pump and governor apparatus to said primary fuel nozzles and by-passing said control valve device, whereby in operation at a high altitude, said control valve device becomes operative upon a predetermined reduction in pressure of fuel in said inlet thereof to cut off further flow of fuel to said secondary fuel nozzles while said primary fuel nozzles remain operative.

HAROLD L. HILDESTAD.

REFERENCES CITED

The following references are of record in the file of this patent:

UNITED STATES PATENTS

| Number | Name | Date |
|---|---|---|
| 980,801 | Kraus | Jan. 3, 1911 |
| 1,493,774 | Dorsey | May 13, 1924 |
| 1,873,781 | Nightingale | Aug. 23, 1932 |
| 2,073,072 | Pontow | Mar. 9, 1937 |
| 2,390,806 | Nagel | Dec. 11, 1945 |

FOREIGN PATENTS

| Number | Country | Date |
|---|---|---|
| 579,417 | Great Britain | June 11, 1943 |